(12) United States Patent
Denome et al.

(10) Patent No.: US 10,185,313 B2
(45) Date of Patent: Jan. 22, 2019

(54) ECO-EFFICIENCY CHARACTERIZATION TOOL

(71) Applicant: Applied Materials, Inc., Santa Clara, CA (US)

(72) Inventors: Mark Robert Denome, Sunnyvale, CA (US); Vijayakumar Venugopal, Berkeley, CA (US); Ashish Kumar, Bangalore (IN); Vijai Thangamany, Bangalore (IN); Somil Kapadia, Bangalore (IN); Ching-Hong Hsieh, Saratoga, CA (US)

(73) Assignee: Applied Materials, Inc., Santa Clara, CA (US)

( * ) Notice: Subject to any disclaimer, the term of this patent is extended or adjusted under 35 U.S.C. 154(b) by 280 days.

(21) Appl. No.: 15/134,234

(22) Filed: Apr. 20, 2016

(65) Prior Publication Data
US 2017/0308071 A1   Oct. 26, 2017

(51) Int. Cl.
*G06F 19/00* (2018.01)
*G05B 19/418* (2006.01)

(52) U.S. Cl.
CPC ............. *G05B 19/41885* (2013.01); *G05B 2219/42155* (2013.01); *Y02P 90/02* (2015.11)

(58) Field of Classification Search
CPC .... G05B 19/41885; G05B 2219/45031; G05B 19/045; G05B 19/042; H01L 2924/00; H01L 2924/00014; H01L 2224/48091
USPC .................................... 700/99, 108; 715/772
See application file for complete search history.

(56) References Cited

U.S. PATENT DOCUMENTS

| | | | |
|---|---|---|---|
| 9,129,231 B2* | 9/2015 | Kaufman | G06Q 10/04 |
| 2010/0249968 A1* | 9/2010 | Neuber | G06Q 10/06 |
| | | | 700/99 |
| 2010/0249975 A1 | 9/2010 | Rezayat | |
| 2011/0144791 A1 | 6/2011 | Loldj et al. | |
| 2015/0347943 A1 | 12/2015 | Burke et al. | |

OTHER PUBLICATIONS

Boyd, Sarah B. "Life-Cycle Energy Demand and Global Warning Potential of Computational Logic." May 28, 2009. Environmental Science & Technology, vol. 43, pp. 7303-7309.*

(Continued)

*Primary Examiner* — Mohammad Ali
*Assistant Examiner* — Md Azad
(74) *Attorney, Agent, or Firm* — Lowenstein Sandler LLP

(57) ABSTRACT

A method for wafer point by point analysis includes receiving a selection of manufacturing equipment, utility use data, and utilization data. A water eco-efficiency characterization is calculated based on the utilization data and the utility use data. An emissions eco-efficiency characterization is calculated based on the utilization data and the utility use data. An electrical energy eco-efficiency characterization is calculated based on the utilization data and the utility use data. A combined eco-efficiency characterization is calculated based on the utilization data and water eco-efficiency characterization, emissions eco-efficiency characterization, and electrical energy eco-efficiency characterizations. The combined eco-efficiency characterization is provided for display by a graphical user interface.

19 Claims, 7 Drawing Sheets

(56) References Cited

OTHER PUBLICATIONS

International Search Report and Written Opinion dated Jul. 25, 2017, on application No. PCT/US20171027155.
Sproedt, Alexander, and Johannes Plehn. "Environmental value stream map as a communicative model for discrete-event material flow simulation." (2014).
Gontarz, Adam, et al. "Resource consumption measurement in manufacturing environments." Proceedings of the GCSM 2012 10th Global Conference on Sustainable Manufacturing. 10th Global Conference on Sustainable Manufacturing, 2012.

* cited by examiner

ECO-EFFICIENCY CHARACTERIZATION TOOL

FIELD OF THE INVENTION

Embodiments of the present invention generally relate to manufacturing equipment eco-efficiency characterization and optimization.

BACKGROUND OF THE INVENTION

The continued demand for electronic devices calls for an increasingly larger demand for semiconductor wafers. The increase in manufacturing to produce these wafers takes a substantial toll on the environment in the form of resource utilization and the creation of environmentally damaging waste. Thus, there is an increased demand for more ecologically-friendly and environmentally responsible methods of wafer manufacture and of manufacturing in general.

SUMMARY

The following is a simplified summary of the disclosure in order to provide a basic understanding of some aspects of the disclosure. This summary is not an extensive overview of the disclosure. It is not intended to delineate any scope of the particular implementations of the disclosure or any scope of the claims. Its sole purpose is to present some concepts of the disclosure in a simplified form as a prelude to the more detailed description that is presented later.

Embodiments of the present invention provide improved methods, systems and software for eco-efficiency characterization.

In one embodiment, eco-efficiency characterization includes receiving, by a processing device, a selection of a manufacturing equipment and utility use data associated with the manufacturing equipment. In one embodiment, the utility use data includes water usage data, gas usage data, and electrical energy usage data. Utility use data may also include data associated with liquid process chemicals. Utilization data associated with a processing time and an idle time of the manufacturing equipment may also be received.

Eco-efficiency characterization may also include calculating a water eco-efficiency characterization, an emissions eco-efficiency characterization, and an electrical energy eco-efficiency characterization based on the first utility use data and the first utilization data.

A combined eco-efficiency characterization may be calculated based on the water, emissions, and electrical energy eco-efficiency characterizations and the first utilization data. The water, emissions, electrical energy, and combined eco-efficiency characterizations may be associated with a per-unit amount of environmental impact generated by the manufacturing equipment. Additionally, the eco-efficiency model may include providing at least one of the water, emissions, electrical energy, and combined eco-efficiency characterizations for display by a graphical user interface (GUI).

In another embodiment, eco-efficiency characterization may include receiving, by a processing device of a manufacturing equipment, a first eco-efficiency characterization of the manufacturing equipment and determining utility use data associated with the manufacturing equipment, the utility use data including: water usage data, gas usage data, and electrical energy usage data. In one embodiment, the first eco-efficiency characterization may be received from the manufacturing equipment itself. In another embodiment, the first eco-efficiency characterization may be received from a server associated with the manufacturing equipment. First utilization data associated with a processing time and an idle time of the manufacturing equipment may also be determined. First utilization data may also include process and product information associated with the manufacturing equipment.

The processing device of the manufacturing equipment may determine an adjustment to one or more settings associated with the manufacturing equipment, the one or more settings based on the first use data, first utilization data, and first eco-efficiency characterization. The adjustment to the one or more settings may cause an increase in the per-unit eco-efficiency of the manufacturing equipment. The processing device of the manufacturing equipment may further implement the adjustment to the one or more settings associated with the second eco-efficiency characterization on the manufacturing equipment.

Furthermore, embodiments of the present disclosure relate to an eco-efficiency characterization system including a memory to store the selection of a manufacturing equipment, first utility use data and first utilization data associated with the manufacturing equipment, and the first, second, third, and combined eco-efficiency characterizations and a processing device, operatively coupled to the memory. In one embodiment the processing device is to perform the operations listed above. In another embodiment, a non-transitory machine-readable storage medium includes instructions that, when accessed by a processing device, cause the processing device to perform the above operations.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Figure 1:
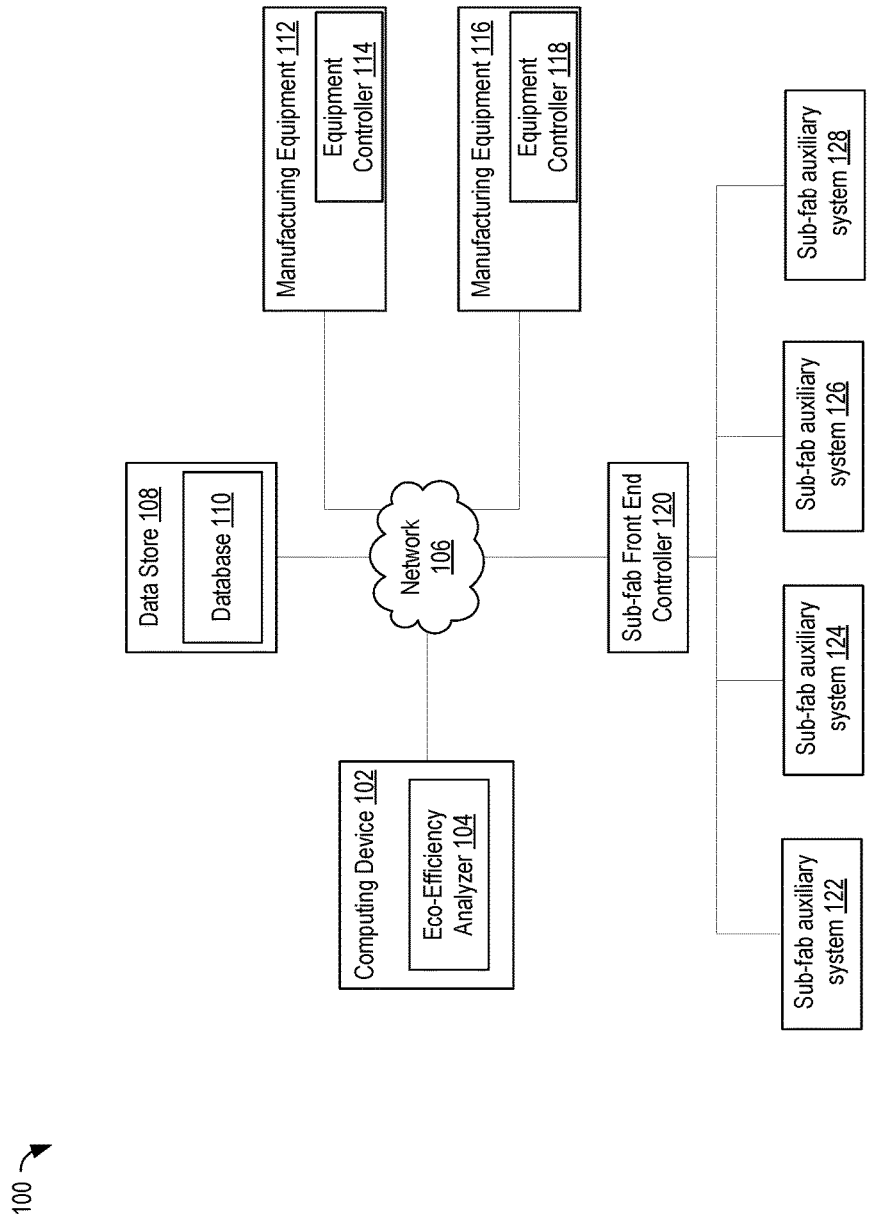
FIG. 1 illustrates an example architecture of a per-unit eco-efficiency characterization system, in accordance with an embodiment of the present invention.

Ecological-efficiency (eco-efficiency) characterization is a complex technique used to determine how different levels of inputs (e.g., resources, utilization, etc.) associated with a particular manufacturing tool during use of the tool impact eco-efficiency of the manufacturing tool. Eco-efficiency characterization may be beneficial during development of a manufacturing tool to help develop manufacturing tools that maximize a per-unit (or per-time) eco-efficiency and minimize harmful environmental impact. Eco-efficiency characterization may also be beneficial after tool development, while the tool is operational, to fine tune the per-unit eco-efficiency characteristics of the tool in view of the specific parameters according to which the tool is operating.

Embodiments described herein provide a system for systematically performing eco-efficiency characterization of a manufacturing tool throughout the design, development and manufacturing process of that tool. Additionally, embodiments further provide a system that is able to refine the eco-efficiency of a manufactured tool during use.

In some embodiments, eco-efficiency is calculated on a per-unit basis. Typically, per-unit eco-efficiency is not taken into account in the manufacturing tool development process. Additionally, it can be a cumbersome and complicated process to characterize per-unit eco-efficiency to adjust settings on a manufacturing tool while that tool is in use (e.g., while a tool is used for wafer production). Furthermore, prior solutions used special eco-efficiency training and specialized engineers and analysts for eco-efficiency characterization analysis. Embodiments of the present disclosure provide improved methods, systems and software for eco-efficiency characterization on a per-unit basis.

In one embodiment, per-unit eco-efficiency characterization may be performed by a software tool in all stages of manufacturing equipment lifecycle, including during the design stages and the operational stages of wafer manufacturing equipment. Eco-efficiency may be the amount of environmental resource (e.g., electrical energy, water, gas, etc.) consumed per unit of equipment production. Eco-efficiency may also be characterized as the amount of environmental impact (e.g., $CO_2$ emissions, heavy metal waste, etc.) generated per unit of equipment production.

Per-unit analysis, where a unit is any measurable quantity (e.g., a substrate (wafer), die, area ($cm^2$), time period, device, etc.) operated on by a manufacturing tool, allows for more precise characterizations. Eco-efficiency on a "per-unit" basis allows for an accurate determination of resource usage and environmental impact per-unit produced, and can be easily manipulated as a measure of value. For example, it may be determined that a particular manufacturing tool has an electrical energy per-wafer-pass eco-efficiency rating of 1.0-2.0 kWh per wafer pass (in other embodiments eco-efficiency ratings may be less than 0.5 kWh, up to 20 kWh, or even greater than 20 kWh per wafer pass), indicating that each wafer operated on by the manufacturing tool may use, for example, 1.0-2.0 kWh of electrical energy per wafer pass. In other embodiments various other amounts of electrical energy may be used. Determining eco-efficiency on a per-wafer-pass basis allows for easy comparison with other manufacturing tools that have a different yearly electrical energy consumption value due to variance in yearly wafer throughput. In one embodiment, eco-efficiency may also be determined on a per-device basis by dividing a per-wafer eco-efficiency characterization by the number of devices per wafer.

Performing per-unit eco-efficiency characterization during the early design stages of equipment manufacturing allows designers to make better, more eco-efficient design choices at minimal cost. Eco-efficiency may be manipulated and improved early on in the design stages of manufacturing equipment. Eco-efficiency characterization early on in the design process may allow for better, more eco-friendly component selection, subsystem design, system integration, process design, process materials selection, and system configuration.

In one embodiment, multiple designers may have parallel access to a database of already calculated eco-efficiency models for specific equipment or subcomponents. The designers may produce prospective designs by selecting and adding together one or more subcomponents, each of which may have their own respective eco-efficiency models. The combined eco-efficiency models of all of the subcomponents may then be combined to produce an overall eco-efficiency model for a prospective design. The prospective design and its eco-efficiency model and the eco-efficiency models of it subcomponents may be stored in a database.

At any time in the development process for a tool, an engineer may alter a configuration of that tool, which may cause a change in the eco-efficiency model for that tool. The changes to the configuration and the resulting changes to the eco-efficiency model may be stored in the database. In this way, per-unit eco-efficiency characterization is collaborative, allowing equipment designers to benefit from each other's work. In one embodiment, designers may see updates to manufacturing equipment design in real-time, as changes associated with eco-efficiency are made. Designers may select the equipment or subcomponents with the desired eco-efficiency for the desired application. Furthermore, per-unit eco-efficiency may be calculated for manufacturing equipment based on known per-unit eco-efficiency characterizations for subcomponents. Such known per-unit eco-efficiency characterizations for subcomponents may be stored in a database. In another embodiment, per-unit eco-efficiency may be calculated for manufacturing equipment based combined utility and utilization data for each of the subcomponents of the manufacturing equipment.

Components and subcomponents may be compared and contrasted. If an eco-efficiency model does not already exist for a particular equipment or subcomponent, the designer may perform an eco-efficiency analysis on the equipment, and store the resulting eco-efficiency model in the database. Designers may have the option to save various versions of equipment in development, with each version having an associated eco-efficiency model. In this way, versioning is traceable and eco-efficiency may be optimized by determining the equipment design version with the desired eco-efficiency.

Manufacturing equipment and subsystems are sometimes used in a variety of applications, each application having its own eco-efficiency. In such a situation, multiple per-unit eco-efficiency characterizations for the same equipment or subcomponent to be used under different conditions may be stored in a database. When a designer selects the appropriate equipment from the database, he may be presented with a variety of applications for the equipment, each with its own per-unit eco-efficiency characterization. Furthermore, a designer is able to select equipment from the database to use as a starting point for a new application that does not yet exist in the database. The designer may modify the parameters of the equipment to match the appropriate application, perform a per-unit eco-efficiency characterization, and store the result back to the database.

In another embodiment, per-unit eco-efficiency characterization may be performed on manufacturing equipment itself during operation. The manufacturing equipment may access real-time variables, such as utilization and utility use data of the equipment, and use the real-time variables in the eco-efficiency model. In this embodiment, manufacturing equipment may fine-tune settings on the equipment to maximize eco-efficiency in view of the current operating conditions of the manufacturing equipment. On-equipment eco-efficiency characterization may be beneficial to fine-tune the eco-efficiency of manufacturing equipment that was designed using theoretical, averaged, or expected variable conditions.

Described are embodiments of methods and systems that perform per-unit eco-efficiency characterization of wafer manufacturing equipment. By performing per-unit eco-efficiency characterization in the design and operational stages of equipment, the eco-efficiency of the equipment can be maximized.

FIG. 1 illustrates an example architecture of a per-unit eco-efficiency characterization system. In one embodiment, the per-unit eco-efficiency characterization system 100 may include a computing device 102, data store 108, manufacturing equipment 112, 116, and sub-fab front end controller 120 with associated sub-fab auxiliary systems 122-128.

The manufacturing equipment 112, 116 may be semiconductor wafer manufacturing equipment that includes one or more processing chambers. For example, the manufacturing equipment 112, 116 may be any combination of an ion implanter, an etch reactor (e.g., a processing chamber), a photolithography device, a deposition device (e.g., for performing chemical vapor deposition (CVD), physical vapor deposition (PVD), ion-assisted deposition (IAD), and so on), or any other combination of manufacturing devices.

In one embodiment, the manufacturing equipment 112, 116 is connected to data store 108, sub-fab front end controller 120 and computing device 102 via network 106. The network 106 may be a local area network (LAN), and may be part of an equipment automation layer that may additionally include routers, gateways, servers, data stores, and so on. The manufacturing equipment 112, 116 may connect to the equipment automation layer (e.g., to the network 106) via a SEMI Equipment Communications Standard/Generic Equipment Model (SECS/GEM) interface, via an Ethernet interface, and/or via other interfaces. In one embodiment, the equipment automation layer enables process data (e.g., data collected by manufacturing equipment 112, 116 during a process run) to be stored in data store 108.

In other embodiments, manufacturing equipment 112, 116 may connect directly to data store 108, sub-fab front end controller 120 and/or computing device 102. In one embodiment, manufacturing equipment 112, 116 may include equipment controllers 114, 118.

In one embodiment, equipment controllers 114, 118 determine the per-unit eco-efficiency models of associated manufacturing equipment 112, 116 during operation. Equipment controllers 114, 118 may also adjust settings associated with the manufacturing equipment 112, 116 based on the determined eco-efficiency models so as to optimize the eco-efficiency of the equipment 112, 116 in light of the current manufacturing conditions.

In one embodiment, equipment controllers 114, 118 may include a main memory (e.g., read-only memory (ROM), flash memory, dynamic random access memory (DRAM), static random access memory (SRAM), etc.), and/or a secondary memory (e.g., a data storage device such as a disk drive). The main memory and/or secondary memory may store instructions for performing various types of manufacturing processes.

The equipment controllers 114, 118 may also include a processing device coupled to the main memory and/or secondary memory (e.g., via a bus) to execute the instructions. The processing device may be a general-purpose processing device such as a microprocessor, central processing unit, or the like. The processing device may also be a special-purpose processing device such as an application specific integrated circuit (ASIC), a field programmable gate array (FPGA), a digital signal processor (DSP), network processor, or the like. In one embodiment, equipment controllers 114, 118 are programmable logic controllers (PLCs).

In one embodiment, equipment controllers 114, 118 may determine an actual eco-efficiency characterization associated with the manufacturing equipment based on first utility use data associated with the manufacturing equipment and first utilization data associated with the manufacturing equipment. The first utility use data and first utilization data may be determined by the equipment controllers themselves. In another embodiment, the first utility use data and first utilization data are received from an external source (e.g., computing device 102). Equipment controllers 114, 118 may compare the actual eco-efficiency characterization to a first eco-efficiency characterization associated with the manufacturing equipment. The eco-efficiency characterizations may be different when different use and utilization data values were used to compute the first eco-efficiency characterization than the actual values associated with the operating manufacturing device.

In one embodiment, equipment controllers 114, 118 may determine that the first eco-efficiency characterization is more eco-efficient than the actual eco-efficiency characterization, indicating that it may be possible to adjust settings on the manufacturing equipment to better optimize the manufacturing equipment for eco-efficiency. In some embodiments, manufacturing equipment may control and adjust subcomponent settings to better optimize eco-efficiency.

Equipment controllers 114, 118 may also determine based on the actual use data, actual utilization data, and an eco-efficiency characterization that the actual use data or the actual utilization data is not the same as use data and utilization data associated with the first eco-efficiency characterization. This may be the case when nominal or estimated data values are used to determine the first eco-efficiency characterization and different, actual recorded data values are used while the manufacturing equipment is in operation. In such a scenario, an adjustment to one or more settings associated with the manufacturing equipment may be beneficial to optimize the eco-efficiency of the manufacturing equipment.

The per-unit eco-efficiency characterization system 100 may further include one or more sub-fab auxiliary systems 122-128 connected to the network 106 via sub-fab front end controller 120. In alternative embodiments, the per-unit eco-efficiency characterization system 100 may include more or fewer components. For example, the per-unit eco-efficiency characterization system 100 may include manually operated (e.g., off-line) manufacturing equipment and sub-fab auxiliary systems that are not connected to network 106.

In one embodiment, sub-fab front-end controller 120 is a controller suitable to control the sub-fab auxiliary systems 122-128. In one embodiment, sub-fab front-end controller 120 may include a main memory (e.g., read-only memory (ROM), flash memory, dynamic random access memory (DRAM), static random access memory (SRAM), etc.), and/or a secondary memory (e.g., a data storage device such as a disk drive). The main memory and/or secondary memory may store instructions for performing various types of manufacturing processes.

The sub-fab front-end controller 120 may also include a processing device coupled to the main memory and/or secondary memory (e.g., via a bus) to execute the instructions. The processing device may be a general-purpose processing device such as a microprocessor, central processing unit, or the like. The processing device may also be a special-purpose processing device such as an application specific integrated circuit (ASIC), a field programmable gate array (FPGA), a digital signal processor (DSP), network processor, or the like. In one embodiment, sub-fab front-end controller 120 is a programmable logic controller (PLC).

In one embodiment, sub-fab auxiliary systems 122-128 may also each have a controller (not shown). Sub-fab auxiliary systems 122-128 may include abatement tools, ac power distributors, primary vacuum pumps, spare vacuum pumps, water pumps, chillers, heat exchangers, process cooling water supplies and delivery systems, etc. In other embodiments, tools like those just described may be considered part of the manufacturing equipment itself and may communicate with equipment controllers 114, 118 directly.

The per-unit eco-efficiency characterization system 100 may further include a data store 108 with associated database 110 to store per-unit eco-efficiency models of manufacturing equipment 112, 116 and/or sub-fab auxiliary systems 122-128. Furthermore, database 110 may store per-unit eco-efficiency models associated with manufacturing equipment and subcomponents not associated with system 100. Additionally, the per-unit eco-efficiency characterization system 100 may include one or more computing devices (e.g., computing device 102) connected to the network 106.

In one embodiment, computing device 102 includes an eco-efficiency analyzer 104. Eco-efficiency analyzer 104 of computing device 102 determines the per-unit eco-efficiency of manufacturing equipment already existing (e.g., manufacturing equipment 112, 116) and/or manufacturing equipment that is currently being designed.

Eco-efficiency characterization determinations made by eco-efficiency analyzer 104 may be used to determine more eco-efficient settings for existing manufacturing equipment 112, 116. Determined settings may be sent to manufacturing equipment 112, 116 via network 106 to be implemented. Eco-efficiency characterization determinations made by eco-efficiency analyzer 104 may also be used to influence design choices, so as to optimize eco-efficiency when new manufacturing equipment is being designed.

Figure 2A:
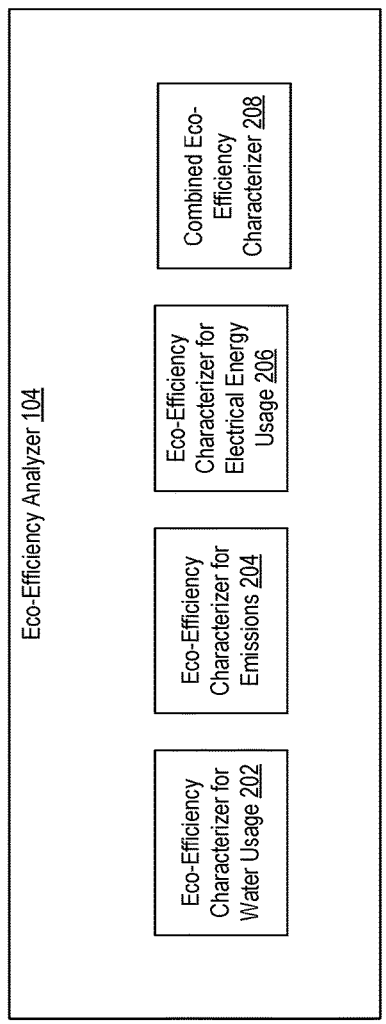
FIG. 2A is an example block diagram of an eco-efficiency analyzer, in accordance with an embodiment of the present invention.

FIG. 2A is an example block diagram of an eco-efficiency analyzer 104, in accordance with an embodiment of the present invention. In one embodiment, eco-efficiency analyzer 104 includes eco-efficiency characterizer for water usage 202, eco-efficiency characterizer for emissions 204, eco-efficiency characterizer for electrical energy usage 206, and combined eco-efficiency characterizer 208. In other embodiments, eco-efficiency analyzer may include characterizers for other categories, such as gas usage, heavy metals, and eutrophication potential. In one embodiment, computing device 102 includes eco-efficiency analyzer 104. This arrangement of modules may be a logical separation, and in other embodiments, these modules or other components can be combined together or separated into further components.

In one embodiment, eco-efficiency characterizers 202-206 determine per-unit eco-efficiency characterizations for each of the respective utilities consumed, or waste streams generated (e.g., heavy metals, eutrophication agents, ozone depleters), by the associated manufacturing equipment (e.g., water, process emissions, electrical energy, etc.). Characterizers 202-206 may receive inputs associated with manufacturing equipment on which to base a per-unit eco-efficiency characterization. Examples of inputs may include: how much of each respective utility/resource/waste the manufacturing equipment consumes or generates, equipment configuration information, component efficiency, process recipes and materials, throughput and/or product information, and utilization (up-time vs. down-time of manufacturing equipment). In one embodiment, the characterizers may be provided with measured, nominal, or estimated values for each of the above inputs.

Eco-efficiency characterizers 202-208 may produce eco-efficiency characterizations associated with each of their respective utilities (e.g., water, process emissions, and electrical energy) based on total equivalent use under the SEMI S23 protocol, extensions of the protocol, summations of gas uses, and/or Process Conversion Factors. In other embodiments, eco-efficiency characterizers for other types of resources (e.g. solids and/or liquid chemicals consumed) may exist.

SEMI S23 is a semiconductor industry standard for measuring, analyzing, reporting and reducing electrical energy requirements and energy conservation for a piece of manufacturing equipment. SEMI S23 defines a method for estimating all of the energy that a particular manufacturing equipment will consume while in use and while idle. This may include electrical energy supplied directly to the equipment and electrical energy consumed to provide non-electrical utilities (water, exhaust, etc.). The S23 protocol may be extended in embodiments to include natural gas and other non-electrical energy use. To estimate the energy used to supply non-electrical utilities to a tool, a set of Energy Conversion Factors (ECFs) may be used. Process Conversion Factors may also be defined and used to estimate process emissions from a process on the basis of the process type and the amounts and types of input materials to the process. One example may be a reactor that burns methane, $CH_4$, with oxygen, $O_2$, to form carbon dioxide, $CO_2$, and water, $H_2O$ according to the reaction $CH_4 + 2O_2 \rightarrow CO_2 + 2 H_2O$. In the presence of sufficient oxygen and in an entirely efficient reactor, each unit mole or unit volume of $CH_4$ input may result in the production of one mole or unit volume of $CO_2$ and two moles or units volume of $H_2O$. In this reactor, the process conversion factor for $CH_4 \rightarrow CO_2$ may be 1 and the process conversion factor for $CH_4$ to $H_2O$ may be 2. Worth mentioning here is that these are not the theoretical stoichiometric ratios of the reaction, but that they are what is actually occurring in the particular reactor. For any number of reasons (e.g., some methane is absorbed into reactor walls, insufficient O2, contaminants reacting with some of the CH4 to form other by-products than CO2 and H2O, etc.) the actual particular reactor may produce actual $CO_2$ and $H_2O$ emissions in ratios associated with amount of input $CH_4$ other than 1 and 2, respectively. In other embodiments, there may be other predictable by-products that can be assigned PCFs. The PCFs for a process may be specific to the process and may be the values that are known by experimentation or other method to actually represent the process.

In one embodiment, Energy Conversion Factors (ECFs) may have the general form:

$$ECF_{utilityX} = \text{electrical energy (kWh)/unity of utility } X$$

For example, the SEMI S23-0708 ECF for deionized (DI) water (UPW) at <25 C is:

$$ECF_{UPW<25C} = 9.0 \text{ kWh/m}^3 \text{ of DI Water}$$

In other words, every 1000 L ($m^3$) of DI water used by an equipment adds 9.0 kWh to the equipment's equivalent energy consumption.

The basic steps of an electrical energy usage analysis as part of a per-unit eco-efficiency characterization might include:

1. Define the scope of the product to be evaluated. This includes determining exactly what hardware is to be characterized. If the object being characterized is a system, it may include determining peripheral equipment such as vacuum pumps and/or abatement to be part of the system or, alternatively, analyzed separately.
2. Select a baseline recipe or process for the evaluation. This may include selecting the recipes and other process specifications that determine the particular application of the equipment for which the characterization will apply. These recipes and processes may determine the use rates of the input utilities (e.g., direct electricity, cooling water, N2, CDA, exhaust, vacuum, etc.).
3. Measure (or estimate) the power and utility consumption while idle and while processing. This may include either measuring or estimating the input utility use rates associated with the recipes and processes selected. SEMI S23 determines equivalent electrical energy requirements for both the processing and idle states, so input utility use rates should be provided for both of those states or, potentially, other states. Once input utility use rates are available, the energy conversion factors (or their rate equivalents) may be applied to the input utilities to calculate equivalent energy use rate in step 4.
4. Use the measured (or estimated) power and utility consumption and the ECFs to calculate the total amount of energy that an end user must consume to operate the tool.
5. Normalize the results to energy per unit product, for example: kWh/wafer-pass or kWh/cm$^2$. This may include the amortization of the idle equivalent energy consumption into the per-unit consumption. For example, if the tool is idle for one hour for every 10 hours that it processes, the equivalent energy consumed in one hour of idle period can be amortized into the number of units produced in the 10 hours of processing.

ECFs may take into account process materials and energy consumed in the supply-chain, before wafer manufacture occurs. Furthermore, Process Conversion Factors may be extended (e.g., as water conversion factors) to estimate the amount of water consumed by and emissions produced by manufacturing equipment. ECFs may be defined for industrial water, drains, and natural gas. In one embodiment, energy balance calculations may be embedded into the eco-efficiency characterization to calculate energy loses to ambient air, energy, and the water requirements for HVAC. Process Conversion Factors and abatement Destruction Removal Efficiencies (DREs) may be used to convert process material and process recipe information into pre and post abatement process emissions characterizations.

The DREs may be rates, expressed as percent of complete removal or conversion, that the abatement process either removes harmful emissions or converts harmful emissions (e.g., as estimated by an eco-efficiency characterizer for emissions using PCFs) into less harmful emissions (e.g., $CO_2$ and inert or common atmospheric gases). For example, a process may produce emissions of $C_2F_6$, a Greenhouse Gas, which may have a Global Warming Potential (GWP) of 9,200, that is, 9200 times the effect of CO2 (GWP=1). A wet-burn abatement system, that is, one that uses combustion of a fuel gas and a wet scrubber, may be employed to convert the $C_2F_6$ into gaseous $CO_2$ and Hydrofluoric Acid, HF (or other dissolved Fluorine compounds), which can be removed in the wet effluent from the scrubber. If the abatement is 100% efficient (DRE=100%), all of the $C_2F_6$ is converted to $CO_2$ emitted as the more relatively benign product of abatement, and HF (or other dissolved Fluorine compounds) removed in the wet effluent and disposed of in a safe manner. Abatement processes may not be, however, 100% efficient. If 1% of the input $C_2F_6$ in a particular abatement process passes through un-abated, the abatement process has a DRE of 99%. The actual post-abatement amounts of unabated input materials and abatement-generated $CO_2$ can also be calculated using the molecular weights of the pre-abatement gases, the pre-abatement gas flows, the DREs, and the molecular weights and formulae of the input gases. Equivalent $CO_2$ pre- and post-abatement can also be calculated. In the example of $C_2F_6$ above, a kilogram of $C_2F_6$ prior to abatement may have the equivalent global warming effect of 9200 kg of equivalent $CO_2$ (9200 kgCO2e). If the abatement is 99% efficient (DRE=99%), the output of the abatement may be 0.01 kg $C_2F_6$ (equivalent global warming impact of 0.01×9200=92 kgCO2e) along with [(0.99×2×44)/138]=0.63 kg $CO_2$ for a total post abatement global warming impact of 92.63 kgCO2e. 44 and 138 are the molecular weights of $CO_2$ and $C_2F_6$, respectively, and the 2 is the ratio of the amount of carbon in one mole of $C_2F_6$ to that in one mole of CO2.

In one embodiment, process recipes may be input to the per-unit eco-efficiency characterizations. A process recipe may specify time, power, flow, temperature, etc. to produce the desired result. Such process recipes may affect the eco-efficiency characterization of the manufacturing equipment. A process recipe input to a per-unit eco-efficiency characterization may be analyzed according to the following example method:

1. Examine the recipe first (or next) step.
2. Determine the step time and output value from the recipe step. In one embodiment the output parameter represents a physical parameter specified for control by the recipe. For example, this could be the RF parameter from the output of an RF generator. Output power may be distinguished from input power of an actuator producing the output. For example, an RF generator may produce an output power of 1000 W as specified by the recipe, but the input power suggested by the generator may be significantly higher due to inefficiency of the generator.
3. Convert the recipe step output value to component output power (if desired). If the recipe controlled parameter is temperature, for example, but the actuation parameter is power to a heater, the recipe output parameter may be converted into the power suggested to maintain the specified temperature. This may be done empirically by observing power vs. temperature relationships for a process. It could also be implemented in some cases by a computational thermodynamic model or other computational physical model in the eco-efficiency analyzer.
4. Determine output power percentage by referring to component full power output specification.
5. Determine component efficiency at recipe step output power by referring to component efficiency curve (output as a percent of input).
6. Calculate component input power requirements for the recipe step.
7. Multiply by recipe step time and repeat factor (e.g., how many times a recipe step should be repeated) to determine input energy requirements for the recipe step 8. Add the step input energy requirements to the total recipe-cycle input energy requirement.
9. Repeat from step 1 above until all recipe steps have been analyzed and the total input energy for the equipment for one recipe cycle has been determined.
10. Divide the total energy for one recipe cycle of n steps by the execution time of the recipe cycle to obtain the average input power requirement during execution of the recipe.

It should be noted that this example shows the calculation method for a single recipe-controlled component. The method may be extended to multiple components for each recipe step by individually evaluating the output power and efficiency curve for each component.

In one embodiment, the eco-efficiency characterizer for water usage may determine, based on the inputs specified for SEMI S23, the equivalent water usage per-unit. Similarly, the remaining characterizers 204, 206 may determine emissions per unit based on inputs of process gas and electrical energy usages on a per-unit basis. Additionally, each of the characterizers 202-206 may determine, based on the inputs, a number of equivalent environmental metrics using a set of environmental metric conversion factors. Factors for converting to these equivalent metrics may be determined with reference to sources such as the Emissions and Generation Resource Integrated Database (eGrid), for example. Environmental metrics may include, but are not limited to, global warming potential based on utility use on a per-unit basis and global warming potential based on emissions on a per-unit basis.

In one embodiment, combined eco-efficiency characterizer 208 may receive as inputs the output characterizations of characterizers 202-206 to determine a combined eco-efficiency characterization. In one embodiment, the combined eco-efficiency characterization is a single benchmark characterization metric value that represents the eco-efficiency of the manufacturing equipment. In embodiments where an eco-efficiency metric is resource use or emissions per unit product, the lower the eco-efficiency value of the eco-efficiency metric, the better the eco-efficiency of the manufacturing equipment. Other embodiments may include eco-efficiency metrics for which a higher value represents better eco-efficiency. An example of such an embodiment may be manufacturing equipment that, as a by-product of its primary function, recovers waste heat energy. An eco-efficiency metric may be defined as heat energy recovered per unit product herein a higher value of the metric represents an increase in the eco-efficiency of the equipment. In one embodiment demonstrating an improvement in eco-efficiency, an eco-efficiency value for electrical energy per-wafer consumption may be 2.08 kWh per wafer pass. In another embodiment, an electrical energy eco-efficiency value for per-wafer consumption may be reduced to 1.9 kWh per wafer pass based on design and/or operational changes to the manufacturing tool. Similarly, equivalent industrial water use may be reduced from 2.1 to 1.9 L per wafer pass or emissions may be reduced from 0.07039 to 0.01689 kg $CO_2e$ per wafer pass in order to effect improvements in eco-efficiency. In other embodiments, the values for eco-efficiency metrics may be reduced (or increased) to and from any other values. In one embodiment, the results of the per-unit eco-efficiency characterizations may be output on a graphical user interface. Characterizations may be displayed in tables, graphs, topographical maps, or any other means of providing information on a display.

In one embodiment, eco-efficiency analyzer 104 provides functionality to compare and contrast various versions of manufacturing equipment. For example, during the development and design stages of wafer manufacturing equipment, designers may create multiple versions (e.g., designs) of the equipment, perform per-unit eco-efficiency characterizations on each version, and compare the results. The design of the equipment may be reverted back to a prior saved design that has preferable eco-efficiency characteristics. Various subcomponents may have different eco-efficiencies, and those eco-efficiencies may be compared and contrasted with respect to the system as a whole. For example, a designer may, during the course of developing a new manufacturing tool, have the option to select from and include a variety of subcomponents that all perform the same function. The designer may compare the system's eco-efficiency using each of the subcomponents to determine which combination of subcomponents yields the most desirable system eco-efficiency result.

All versions of the design and associated characterizations may be saved in a database for future analysis or use. During development, the inputs to the per-unit eco-efficiency characterization may be received from an existing prototype of the wafer manufacturing equipment being designed. After characterization, designers have the ability to modify the design of the prototype and re-characterize the eco-efficiency to determine how best to optimize the eco-efficiency of the equipment.

In another embodiment, eco-efficiency analyzer 104 may determine that one or more adjustments may be made to the settings of manufacturing equipment. Such adjustments may increase the eco-efficiency of the manufacturing equipment. Eco-efficiency analyzer 104 may send the adjustments to the manufacturing equipment to be implemented. Furthermore, eco-efficiency analyzer 104 may receive two eco-efficiency characterizations, compare the two to determine which characterization is associated with a better eco-efficiency, and display the results of the comparison on a GUI. In one other embodiment, eco-efficiency analyzer may provide design change recommendations based on the comparison, in view of the second eco-efficiency characterization being associated with a higher eco-efficiency characterization than the first characterization.

Figure 2B:
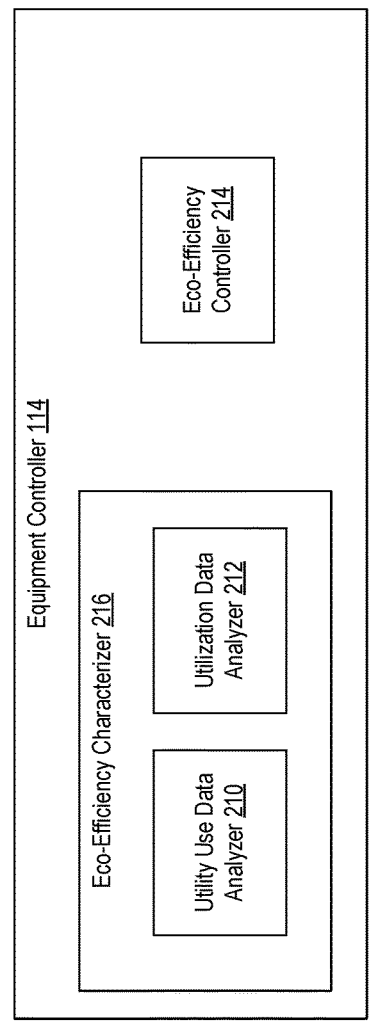
FIG. 2B is a block diagram of an equipment controller, in accordance with an embodiment of the present invention.

FIG. 2B is a block diagram of an equipment controller 114, in accordance with an embodiment of the present invention. In one embodiment, equipment controller 114 includes eco-efficiency characterizer 216, including utility use data analyzer 210 and utilization data analyzer 212, and eco-efficiency controller 214. In one embodiment, manufacturing equipment 112 includes equipment controller 114. This arrangement of the utility usage data analyzer 210, the utilization data analyzer 212 and the eco-efficiency controller 214 may be a logical separation, and in other embodiments, these modules or other components can be combined together or separated into further components.

The modules of equipment controller 114 may be integrated into manufacturing equipment 112 to provide automatic real-time monitoring, reporting, and optimization of the eco-efficiency of manufacturing equipment 112 while the equipment is in operation.

In one embodiment, eco-efficiency characterizer 216 performs the per-unit eco-efficiency characterization functionality of characterizers 202-208 of FIG. 2A. An initial eco-efficiency model may be stored in equipment controller 114. This initial eco-efficiency model may be based on predicted utility use data and/or predicted usage data. However, the actual utility use data and equipment usage data may differ from the predicted data. Utility use analyzer 210 may determine an actual amount of utilities being used by the associated manufacturing equipment while in operation. Worth noting is that while eco-efficiency characteristics may have been determined for the manufacturing equipment while in development, designers may have estimated inputs (e.g., utility use values) for the characterization. While the manufacturing equipment is in operation, the inputs may be different than the estimated values used in design. An eco-efficiency characterization performed by the manufacturing equipment, using actual utility use values, may help to more accurately characterize the per-unit eco-efficiency of the manufacturing equipment.

The utilization data analyzer 212 may determine the utilization of the associated manufacturing equipment. Utilization may be the ratio of the time the equipment is operating to the time it remains idle. In one embodiment, utilization is expressed as a percentage of the time the equipment is operational (e.g., actively manufacturing wafers). In one embodiment, default utilization may be: 70% operational time, 25% idle time, and 5% time not consuming any utilities (e.g., the equipment is off). In other embodiments various other utilization time values may be used. Utilization data may also include information about throughput (product units/time) and the product itself such as wafer size, number of devices per wafer, etc. The latter information may be used to calculate characterizations per unit other than wafer-pass (e.g., per device).

Using the utility and utilization information of 210 and 212, eco-efficiency characterizer 216 may determine the eco-efficiency characteristics of the associated manufacturing equipment.

In one embodiment, eco-efficiency characterizer 216 may compare measured utility use data and utilization use data to the predicted utility and utilization use data used to determine the original eco-efficiency characteristics of the manufacturing equipment. A new eco-efficiency characterization may be calculated based on the actual utility use data and utilization data recorded by the manufacturing equipment. Differences between the two eco-efficiency characterizations may indicate that the manufacturing equipment may be further optimized for eco-efficiency by adjusting settings related to the manufacturing equipment. In one embodiment, new eco-efficiency characterizations may be determined for each of emissions, electrical energy, and water eco-efficiency. A new combined eco-efficiency characterization may additionally be determined. In this way, actual eco-efficiency of a manufacturing equipment may be directly compared to theoretical eco-efficiency for the manufacturing equipment determined during the design states of the equipment.

These new eco-efficiency characterizations may be determined by eco-efficiency analyzer 104 and sent to the equipment controller 114 to be used to update the eco-efficiency characteristics for the associated manufacturing tool. New eco-efficiency characterizations determined by eco-efficiency analyzer 104 may also be sent to subcomponents of a manufacturing tool to be updated. Manufacturing tools and subcomponents may send updates to other tools and subcomponents that use the tools and subcomponents in similar ways. Furthermore, eco-efficiency characterization updates and/or updated settings may be sent to and stored in a database for future use in manufacturing tool and subcomponent design.

Based on the eco-efficiency characteristics determined by eco-efficiency characterizer 216, eco-efficiency controller 214 may determine and adjust settings of manufacturing equipment associated with equipment controller 114 to better optimize the eco-efficiency of the equipment. In one embodiment, utility consumption may be reduced when manufacturing equipment is idle. Another embodiment may apply in the case where a "push-pull" actuation system is used, that is where, one actuator (generally cooling) operates primarily open loop while an opposing actuator (generally heating) operates closed loop to control the temperature. By looking at the recipe and/or temperature sensors on the equipment to determine when periods of maximum cooling will and will not be desired, the closed loop cooling system may be modulated by controller 214 to minimize cooling when maximum cooling is not desired (temperature ramp-up, extended periods of low power input to the process, etc.). This may reduce utility use by the cooling actuator and may reduce utility use by optimizing the amount of heating input. In other embodiments, other controller 214 may adjust other settings to optimize eco-efficiency of the equipment.

In one embodiment, eco-efficiency controller 214 makes the changes to the equipment settings automatically, without additional user input. In another embodiment, eco-efficiency controller 214 reports the results of its analysis to a server to be further analyzed and acted upon. In one embodiment, the modules of equipment controller 114 report their characterization results to a database, where the results may be used to better optimize the design of current and future manufacturing equipment.

Figure 3:
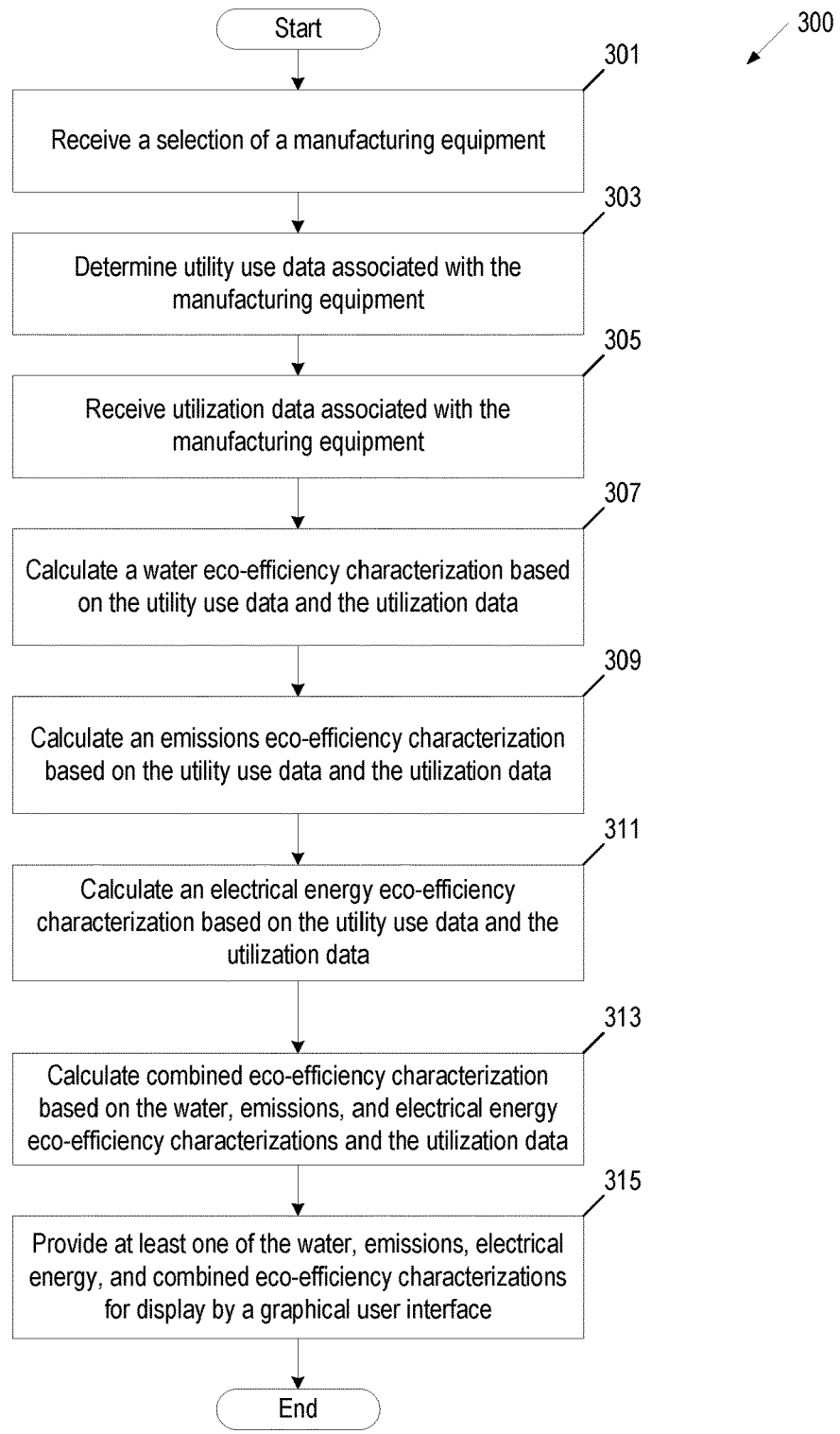
FIG. 3 is a flow diagram illustrating a method for eco-efficiency characterization, in accordance with an embodiment of the present invention.

FIG. 3 is a flow diagram illustrating a method for eco-efficiency characterization, in accordance with an embodiment of the present invention. The method 300 may be performed by processing logic that comprises hardware (e.g., circuitry, dedicated logic, programmable logic, microcode, etc.), software (e.g., instructions run on a processing device to perform hardware simulation), or a combination thereof. In one embodiment, characterizers 202-208 of eco-efficiency analyzer 104 executing on computing device 102 perform method 300.

Referring to FIG. 3, at block 301, processing logic receives a selection of manufacturing equipment. In one embodiment, the selection is received from a graphical user interface (GUI). The selection may be manually input directly into the GUI or selected from a database associated with the GUI. When the selection is retrieved from a database with an associated per-unit eco-efficiency characterization, a user may have the option to accept the manufacturing equipment with corresponding characterization, select a different per-unit eco-efficiency characterization also associated with the manufacturing equipment, or perform a new per-unit eco-efficiency characterization for the manufacturing equipment. A user may choose to edit an existing per-unit eco-efficiency characterization for a retrieved manufacturing equipment.

At block 303, whether or not the manufacturing equipment selection was input manually or retrieved from a database, processing logic may determine utility use data associated with the manufacturing equipment. The utility use data may include direct water usage data, gas usage data, and direct electrical energy usage data. The utility use data may also include other utility use data associated with, for example, cooling water, utility nitrogen, clean-dry/oil-free compressed air, exhaust, deionized/ultra-pure water and/or other liquid chemical usage data, mechanical vacuum systems, and drain systems. The utility use data may include actual data recorded from an existing manufacturing equipment, nominal values, predicted values, or estimated values. In one embodiment, the manufacturing equipment is a prototype currently in a design state of development. In such a case, estimated utility use data may be received by processing logic. In another embodiment, utility use data may be received that is associated with a manufacturing equipment related to the equipment prototype.

At block 305, processing logic may receive utilization data associated with the manufacturing equipment. The utilization data may be associated with a processing time and an idle time of the manufacturing equipment. For example, utilization data may indicate that the selected manufacturing equipment is active 70% of the time while idle 25% of the time, and off the remaining 5%. The utilization data may include actual data recorded from an existing manufacturing equipment, nominal values, predicted values, or estimated values. Utilization data may also include data associated with the process and product associated with the manufacturing equipment.

At blocks 307, 309, and 311, processing logic calculates a water eco-efficiency characterization, an emissions eco-efficiency characterization, and an electrical energy eco-efficiency characterization based on the utility use data and utilization data. In one embodiment, process recipe data associated with a process being performed by the manufacturing equipment may also be used to calculate the characterizations.

In one embodiment, at block 307, processing logic uses a set of utilities requiring the use of water (e.g., cooling, nitrogen, exhaust, vacuum, etc.) to calculate an equivalent water use characterization, that is, the amount of industrial water needed to provide those utilities. Similarly, processing logic at block 311 calculates an equivalent electrical energy characterization giving the estimated electrical energy used to provide the utilities. At block 309, processing logic may use gas usage and utilization data to calculate an emissions characterization (pre- and post-abatement). Waste streams such as heavy metals, eutrophication agents, and ozone depleters may also be used to calculate the emissions characterization. All three of these characterizations may be converted to equivalent CO2 emissions units, and, once expressed in this common unit, summed to a single characterization metric.

In one embodiment, all three characterizations are also based on the utilization data received at block 305. In one embodiment, characterizers 202-206 perform the first, second and third, characterizations in view of the methods and operations described with respect to FIG. 2. The equivalent water, equivalent emissions, and equivalent electrical energy per-unit eco-efficiency characterizations calculated in blocks 307-311 may be displayed on a GUI. Additionally, the water, emissions, and electrical energy per-unit eco-efficiency characterizations calculated in blocks 307-311 may be stored in a database for future use. In one embodiment, water and electrical energy characterizations are based on water usage, electrical energy usage, and other data associated with, for example, cooling water, utility nitrogen, clean-dry/oil-free compressed air, exhaust, deionized/ultra-pure water and/or other liquid chemical usage data, mechanical vacuum systems, and drain systems. Each of the these utilities and systems may consume water and electricity. In one embodiment, water usage is determined for the above utilities and systems, summed, and provided to processing logic to perform water characterization. In another embodiment, the electrical energy usage is determined for the above utilities and systems, summed, and provided to processing logic to perform electrical energy usage characterization.

At block 313, processing logic calculates a combined eco-efficiency characterization based on the water, emissions, and electrical energy eco-efficiency characterizations and the utilization data. The water, emissions, electrical energy, and combined, eco-efficiency characterizations may be associated with a per-unit amount of environmental impact generated by the manufacturing equipment, as described with respect to FIG. 2. In one embodiment, a single per-unit eco-efficiency value is calculated at block 313. The value may be indicative of the combined eco-efficiency of the associated manufacturing equipment. In one embodiment, the higher the value of an eco-efficiency metric, the better the eco-efficiency of the manufacturing equipment. In other embodiments, the lower the value of an eco-efficiency metric, the better the eco-efficiency.

At block 315, processing logic may provide at least one of the water, emissions, electrical energy, and combined eco-efficiency characterizations for display by a GUI. In one embodiment, the water, emissions, electrical energy, and combined per-unit eco-efficiency characterizations are all displayed concurrently on the GUI. In other embodiments, a user of the GUI may select characterizations to display and compare.

Figure 4:
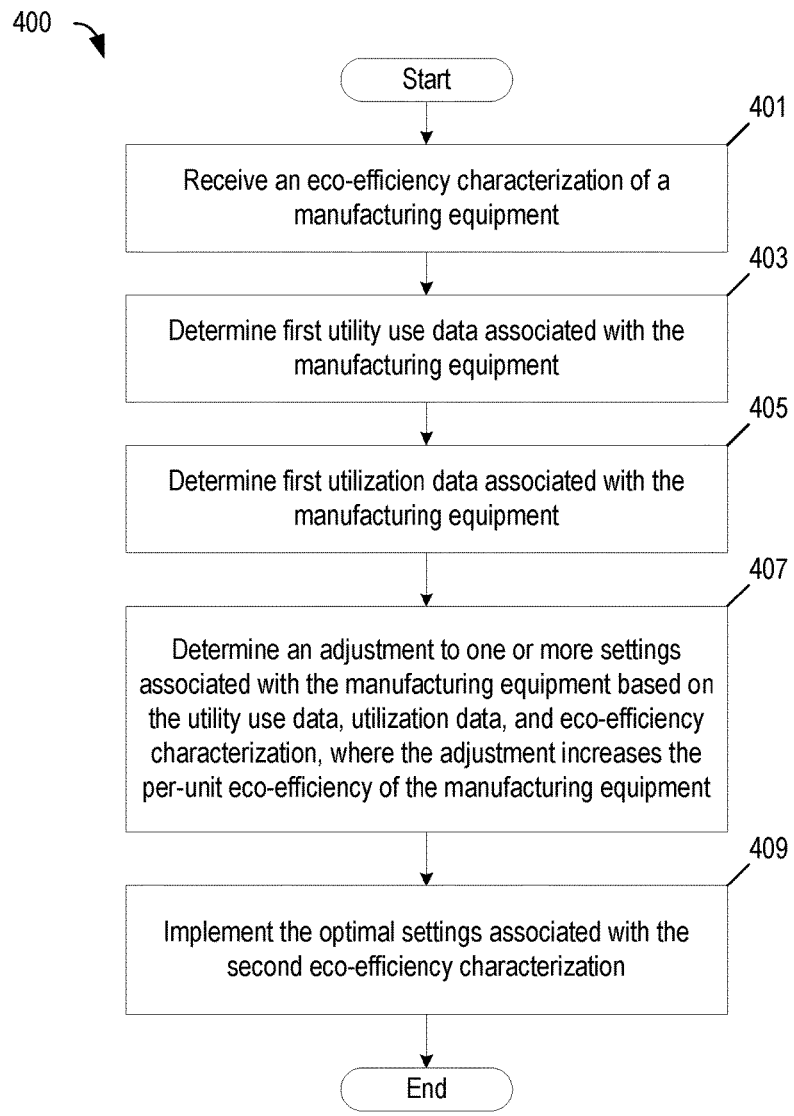
FIG. 4 is a flow diagram illustrating a method for on-equipment eco-efficiency characterization, in accordance with an embodiment of the present invention.

FIG. 4 is a flow diagram illustrating a method for on-equipment eco-efficiency characterization, in accordance with an embodiment of the present invention. The method 400 may be performed by processing logic that comprises hardware (e.g., circuitry, dedicated logic, programmable logic, microcode, etc.), software (e.g., instructions run on a processing device to perform hardware simulation), or a combination thereof. In one embodiment, modules 210, 212, and 214 of equipment controller 114 executing on manufacturing equipment 112 perform method 300.

Referring to FIG. 4, at block 401, processing logic may receive a previously determined eco-efficiency characterization of a manufacturing equipment. In one embodiment, the eco-efficiency characterization may be received from a database. In another embodiment, the eco-efficiency characterization is received from the manufacturing equipment itself. For example, a per-unit eco-efficiency characterization may have already been determined (by processing logic in FIG. 3, for example) and downloaded to the manufacturing equipment.

At block 403 and 405, utility use data and utilization data is determined. In one embodiment, utility data includes water, gas, and electrical energy usage data. Utility use data and utilization data may be received from the manufacturing equipment itself. In one embodiment, the manufacturing equipment records and maintains record of utility and utilization use data. The utility and utilization use data may be uploaded to a database and/or received from a database by the manufacturing equipment. In one embodiment, the manufacturing equipment is currently operating under a different set of conditions (recipe parameters, utility usage, utilization time, etc.) than the model set of conditions specified when the original per-unit eco-efficiency characterization was determined. For example, the original set of conditions may be associated with a model reference control system used to minimize the use of utilities and maximize eco-efficiency of the equipment.

As discussed above with respect to FIG. 1, to determine that an adjustment to settings may be made to increase eco-efficiency of a tool, processing logic may determine that actual utility and utilization use data does not match with utility and utilization use data used to make the initial eco-efficiency characterization. In this scenario, processing logic may determine that actual eco-efficiency of the manufacturing tool is less than estimated eco-efficiency for the tool and that changes may be made to the manufacturing equipment that increase the eco-efficiency of the equipment.

At block 407, processing logic determines, based on the use data, utilization data, and eco-efficiency characterization that an adjustment may be made to one or more settings associated with the manufacturing equipment. The adjustment to the settings may increase the eco-efficiency of the manufacturing equipment. In one embodiment, processing logic determines a new per-unit eco-efficiency characterization based on the received use and utilization data of the manufacturing equipment. The previous per-unit eco-efficiency characterization may be compared to the new per-unit eco-efficiency characterization to determine which is more eco-efficient. The new per-unit eco-efficiency characterization and the results of the comparison may be stored in a database for future use. At block 409, processing logic implements the determined adjustment to the settings associated with the manufacturing equipment. In one embodiment, processing logic at block 409 implements the determined adjustment to the settings associated with the manufacturing equipment when the new settings result in improved eco-efficiency and the settings can be implemented without detrimental impact to relevant equipment performance parameters.

Figure 5:
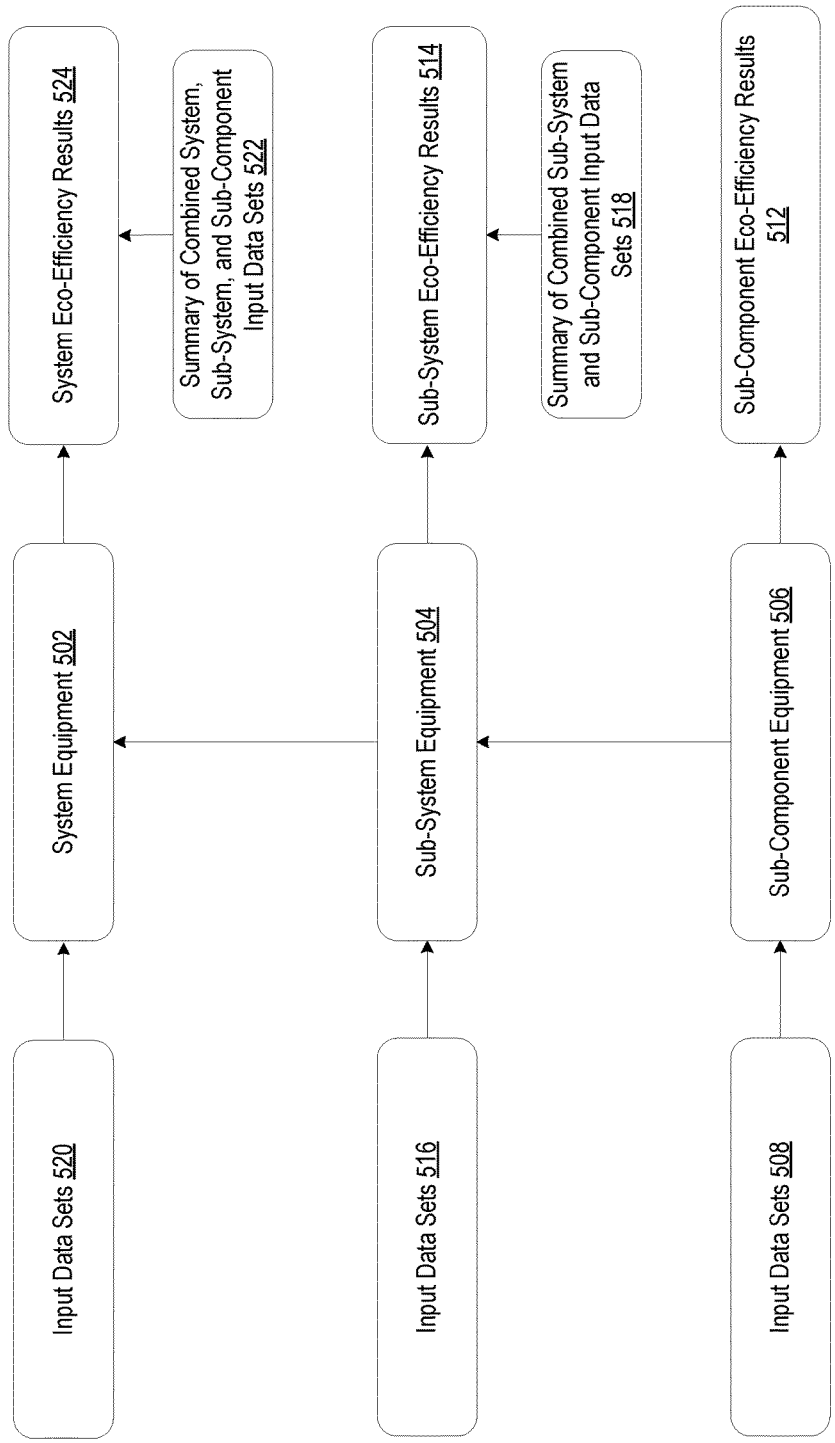
FIG. 5 is a block diagram of a multicomponent manufacturing equipment system, in accordance with an embodiment of the present invention.

FIG. 5 is a block diagram of multicomponent manufacturing equipment system, in accordance with an embodiment of the present invention. In one embodiment, a system (e.g., manufacturing equipment 112, 116 of FIG. 1) includes multiple sub-systems (e.g. sub-fab auxiliary systems 122-128 of FIG. 1) 504. Sub-systems 504 may alternatively be included as part the equipment 112, 116 itself. Subsystems 504 may also include multiple sub-components 506. In one embodiment, eco-efficiency characterizations for the system 502 may be determined by determining eco-efficiency characterizations for all sub-systems 504 and sub-components 506 included in the system.

For example, sub-components 506 may receive inputs such as utility use data and utilization data 508. Based on the inputs, an eco-efficiency characterization 512 may be determined for each of the sub-components 506. Next, eco-efficiency characterizations 514 may be determined for each sub-system 504 based on inputs 516 to the sub-systems 504 and sub-component inputs 508. Rolled-up summary of all inputs 518 may include a summary of input data sets 516 and 508 used to determine sub-system eco-efficiency results 514. In another embodiment, sub-component eco-efficiency results 512 may be used to calculate eco-efficiency characterizations 514. Accordingly, eco-efficiency for the sub-system may be determined based at least in part on the eco-efficiencies that have been computed for each of the sub-components that make up the sub-system.

The eco-efficiency characterization of the system as a whole (e.g. a manufacturing tool) 524 may be determined based on a summary of all inputs to the system 522 including direct inputs to the system 520, inputs 516 to the sub-systems 504, and inputs 508 to the sub-components 506 included in the system. Rolled-up summary of all inputs 522 may include a summary of input data sets 520, 516 and 508 used to determine system eco-efficiency results 524. In another embodiment, sub-system eco-efficiency results 514 and sub-component eco-efficiency results 512 may be used to calculate eco-efficiency characterizations 524. In one embodiment, sub-systems 504 and sub-components 506 may have a variety of eco-efficiency characterizations based on their inputs 516, 508. In one embodiment, sub-system and sub-component eco-efficiency results 512, 514 may be used to calculate eco-efficiency characterizations 524. In such a case, eco-efficiency characterization for the systems as a whole may be determined based on not only which particular sub-systems and sub-components are used, but also based on changes to the eco-efficiency of the sub-systems and sub-components based on changes to their inputs.

Figure 6:
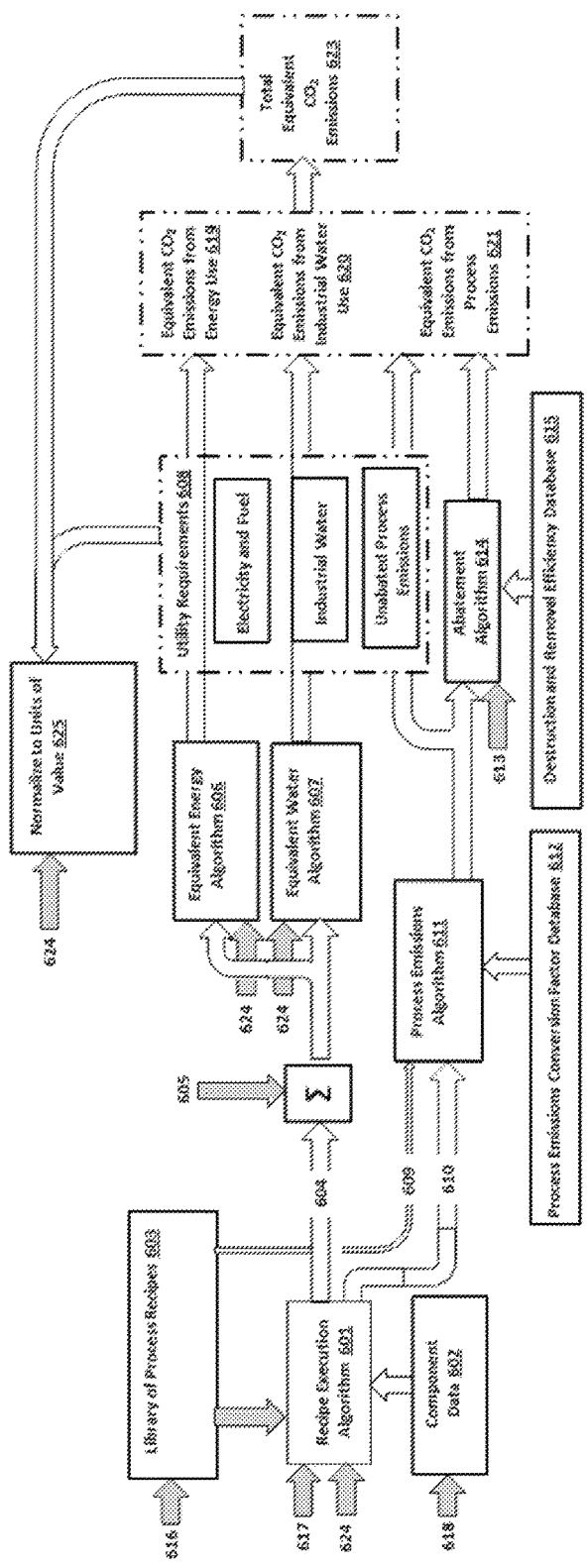
FIG. 6 is a block diagram of a per-unit eco-efficiency characterization system, in accordance with an embodiment of the present invention.

FIG. 6 is a block diagram of a per-unit eco-efficiency characterization system, in accordance with an embodiment of the present invention. In one embodiment, a recipe execution algorithm 601 may receive manufacturing equipment utilization data 624 and process recipe information for the current active recipe on a manufacturing equipment from a library of process recipes 603. Recipe execution algorithm may also receive structure information 617 for the manufacturing equipment. The structure information 617 may include specific sub-systems and sub-components included in the manufacturing equipment. Recipe execution algorithm 601 may also receive component data 602 associate with component information 618. The component data may include component data for the sub-components as they are configured for the manufacturing equipment. Component data may include the output vs. input power ratio efficiency of the components that are controlled by recipes on the basis of their output powers. The component efficiency data may have been previously generated for one or more of the sub-components.

Process recipe library 603 may include recipes manually input by a user, recipes parsed from equipment recipe files, and/or recipes directly uploaded from manufacturing equipment. Recipes may include information such as step/time data, process power data, process material use-rates, and/or mechanical motion data. In one embodiment, equipment efficiency data may include equipment information manually input by a user and/or equipment information from an existing equipment specification database.

Recipe-dependent energy use 604 (determined by the recipe execution algorithm 601) may be combined with non-recipe dependent utility use information 605 (e.g., the set of fab-provided facilities utilities used by the equipment (electricity, cooling water, N2, CDA, exhaust, vacuum, etc.)) and manufacturing equipment utilization data 624 and analyzed according to an equivalent energy algorithm 606 and equivalent water algorithm 607, as discussed above, to determine the amount of electricity, water, and fuel to operate the manufacturing equipment 608. Similarly, a process type 609 (e.g., an X etch process type or a PVD Y process type) from the process recipe library 603 and recipe dependent process material use 610 from the recipe execution algorithm 601 may be input to a process emissions algorithm 611 to determine unabated process emissions 608 from the manufacturing equipment. Furthermore, if abatement is being used with respect to the manufacturing equipment, the type of abatement 613 and the unabated process emissions may be input into an abatement algorithm 614 to determine abated process emissions for the manufacturing device. The abatement algorithm 614 may be associated with destruction and removal efficiency (DRE) factors from a DRE database 615.

Electricity and fuel, industrial water, unabated process emissions, and abated process emissions 608, 614 may be compared to published values for equivalent $CO_2$ emissions to determine equivalent $CO_2$ emissions values for energy use 619, treatment and delivery of industrial water 620, and global warming potential (emission values for greenhouse gases) 621. These values may be summed to determine the total equivalent $CO_2$ emissions from operating the manufacturing equipment using the specified recipe 623 and under other non-recipe dependent conditions specified in 605 and 624. This value may be normalized to units of value produced by the manufacturing equipment (e.g., wafers, devices, unit area, etc.) with utilization data 624 from the manufacturing equipment to determine the per-unit eco-efficiency 625 of the manufacturing equipment. It is worth noting that process 600 shows only one embodiment of processing the results of algorithms 606, 607 and 611 to calculate a combined eco-efficiency metric which is, in the case of this embodiment, total equivalent CO2 emissions. Other embodiments of the invention may combine the results of the first, second and third characterizations of 606, 607 and 611 in such a way as to calculate other single combined eco-efficiency metrics.

Figure 7:
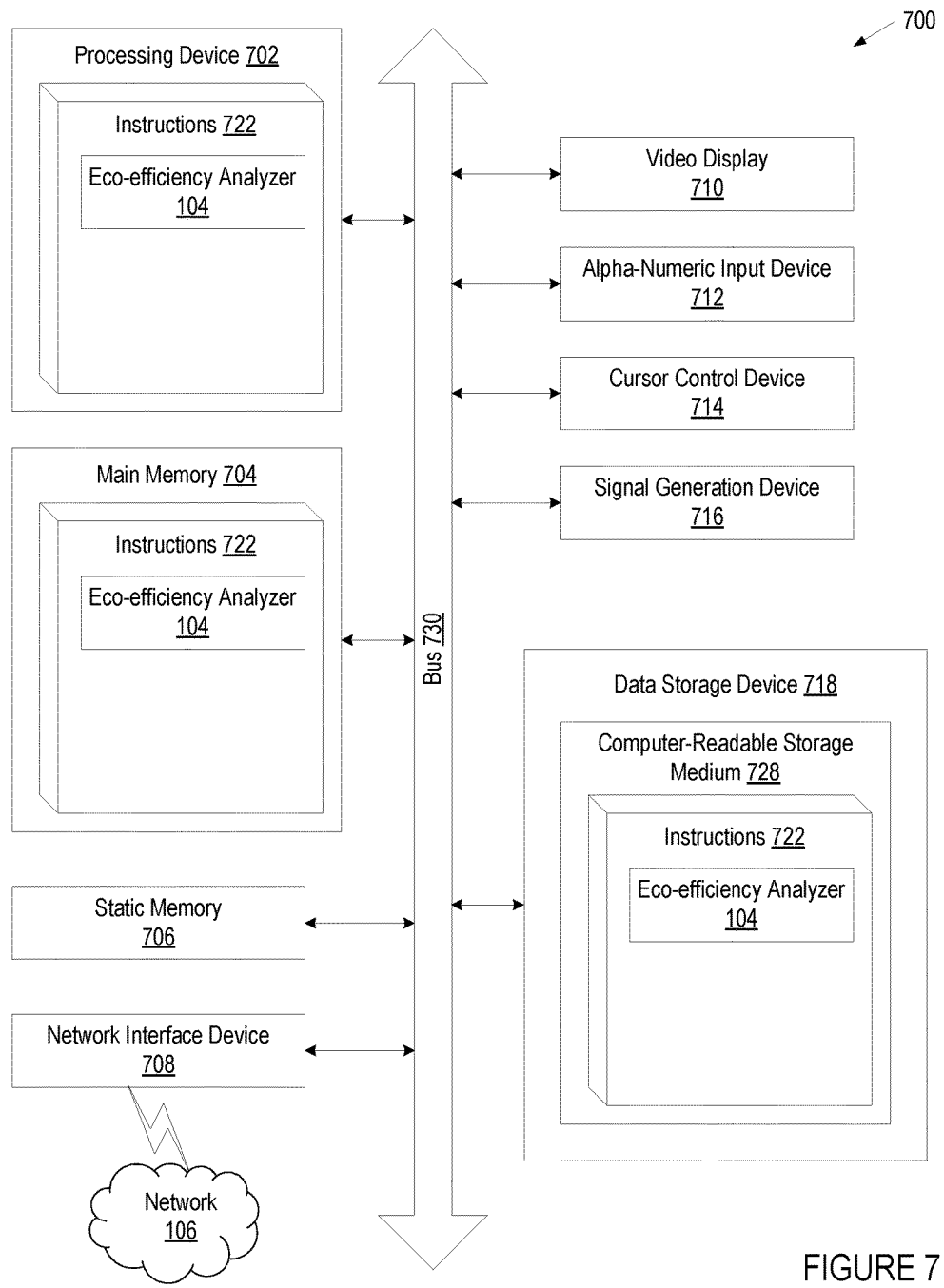
FIG. 7 is a block diagram of an example computer system that may perform one or more of the operations described herein.

FIG. 7 illustrates a diagram of a machine in the example form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 722 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable storage medium 728 on which is stored one or more sets of instructions 722 (e.g., software) embodying any one or more of the methodologies or functions described herein, including eco-efficiency analyzer 104 as shown in FIG. 7.

The instructions 722 may also reside, completely or at least partially, within the main memory 704 and/or within the processor 702 during execution thereof by the computer system 700, the main memory 704 and the processor 702 also constituting computer-readable storage media. The instructions 722 may further be transmitted or received over a network 106 via the network interface device 708.

In one embodiment, the instructions 722 include instructions for integrating per-unit eco-efficiency characterization and/or a software library containing methods that call an eco-efficiency analyzer 104 including instructions for per-unit eco-efficiency characterization. While the computer-readable storage medium 728 (machine-readable storage medium) is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "calculating", "providing", "sending," "storing," "comparing," "modifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should be determined with reference to the appended claims, along with the full scope of equivalents to which such claims are entitled.

What is claimed is:

1. A method, comprising:
   receiving, by a processing device, a selection of a manufacturing equipment;
   determining first utility use data associated with the manufacturing equipment;
   receiving first utilization data associated with the manufacturing equipment, wherein the utilization data is associated with a processing time and an idle time of the manufacturing equipment;
   calculating, by the processing device, a water eco-efficiency characterization based on the first utility use data and the first utilization data;
   calculating, by the processing device, an emissions eco-efficiency characterization based on the first utility use data and the first utilization data;
   calculating, by the processing device, an electrical energy eco-efficiency characterization based on the first utility use data and the first utilization data;
   calculating, by the processing device, a combined eco-efficiency characterization associated with a design of the manufacturing equipment based on the water eco-efficiency characterization, the emissions eco-efficiency characterization, and the electrical energy eco-efficiency characterization and the first utilization data, wherein the water eco-efficiency characterization, the emissions eco-efficiency characterization, the electrical energy eco-efficiency characterization, and the combined eco-efficiency characterization are associated with a per-unit amount of environmental impact generated by the manufacturing equipment;
   comparing the combined eco-efficiency characterization to an updated combined eco-efficiency characterization associated with an updated design of the manufacturing equipment; and
   implementing, based on the updated combined eco-efficiency characterization, the updated design of the manufacturing equipment responsive to determining that the updated combined eco-efficiency characterization is associated with a lower per-unit amount of environmental impact than the combined eco-efficiency characterization.

2. The method of claim 1, further comprising:
   determining an adjustment to one or more settings associated with the manufacturing equipment, the one or more settings based on the first utility use data, the first utilization data, and the combined eco-efficiency characterization, wherein the adjustment to the one or more settings causes an increase to per-unit eco-efficiency of the manufacturing equipment; and
   sending the adjustment to the one or more settings to the manufacturing equipment to be implemented.

3. The method of claim 1, wherein the first utility use data is associated with
   at least one of: cooling water, utility nitrogen, compressed air, exhaust, deionized water, mechanical vacuum systems, process gas, direct electrical energy, direct industrial water, liquid process chemicals, or drain systems.

4. The method of claim 1, wherein calculating the combined eco-efficiency characterization further comprises:
   receiving a selection of subcomponents of the manufacturing equipment, each subcomponent having a plurality of subcomponent inputs; and
   calculating the combined eco-efficiency characterization based on the plurality of subcomponent inputs.

5. The method of claim 1, wherein calculating the combined eco-efficiency characterization further comprises:
   receiving process recipe data associated with a process of the equipment; and
   calculating the water eco-efficiency characterization, the emissions eco-efficiency characterization, and the electrical energy eco-efficiency characterization based on the process recipe data.

6. The method of claim 1, further comprising providing at least one of the water eco-efficiency characterization, the emissions eco-efficiency characterization, the electrical energy eco-efficiency characterization, or the combined eco-efficiency characterization for display by a graphical user interface (GUI).

7. A method, comprising:
   receiving, by a processing device of a manufacturing equipment, a first eco-efficiency characterization of the manufacturing equipment, the first eco-efficiency characterization comprising a per-unit eco-efficiency of the manufacturing equipment;
   determining, by the processing device, first utility use data associated with the manufacturing equipment, the first utility use data associated with at least one of: cooling water, utility nitrogen, compressed air, exhaust, deionized water, mechanical vacuum systems, process gas, direct electrical energy, direct industrial water, liquid process chemicals, or drain systems;
   determining, by the processing device, first utilization data associated with the manufacturing equipment, wherein the first utilization data is associated with a processing time and an idle time of the manufacturing equipment;
   comparing an actual eco-efficiency characterization based on the first utility use data and the first utilization data to the first eco-efficiency characterization to determine whether the first eco-efficiency characterization is more eco-efficient than the actual eco-efficiency characterization;
   responsive to determining that the first eco-efficiency characterization is more eco-efficient than the actual eco-efficiency characterization, determining, by the processing device, an adjustment to one or more settings associated with the manufacturing equipment based on the first utility use data, the first utilization data, and the first eco-efficiency characterization, wherein the adjustment to the one or more settings causes an increase in the per-unit eco-efficiency of the manufacturing equipment; and implementing, by the processing device, the adjustment to the one or more settings associated with the manufacturing equipment.

8. The method of claim 7, further comprising:

determining a second eco-efficiency characterization based on the first utility use data, the first utilization data, and the adjustment to one or more settings associated with the manufacturing equipment; and storing the second eco-efficiency characterization in a database.

9. The method of claim 8, further comprising:

determining, based on the first utility use data, the first utilization data, and the first eco-efficiency characterization, that at least one of the first utility use data or first utilization data is not the same as a second utility use data and a second utilization data, wherein the second utility use data and the second utilization data is associated with the second eco-efficiency characterization; and based on the determination, determine the adjustment to one or more settings associated with the manufacturing equipment.

10. A system comprising:

a memory to store a selection of a manufacturing equipment, first utility use data and first utilization data associated with the manufacturing equipment, and a water eco-efficiency characterization, emissions eco-efficiency characterization, electrical energy eco-efficiency characterization, and a combined eco-efficiency characterization; and a processing device, operatively coupled to the memory, the processing device to:

receive the selection of the manufacturing equipment;

determine the first utility use data associated with the manufacturing equipment;

receive the first utilization data associated with the manufacturing equipment, wherein the first utilization data is associated with a processing time and an idle time of the manufacturing equipment;

calculate the water eco-efficiency characterization based on the first utility use data and the first utilization data;

calculate the emissions eco-efficiency characterization based on the first utility use data and the first utilization data;

calculate the electrical energy eco-efficiency characterization based on the first utility use data and the first utilization data;

calculate the combined eco-efficiency characterization associated with a design of the manufacturing equipment based on the water eco-efficiency characterization, emissions eco-efficiency characterization, and electrical energy eco-efficiency characterization and the first utilization data, wherein the water eco-efficiency characterization, the emissions eco-efficiency characterization, the electrical energy eco-efficiency characterization, and combined eco-efficiency characterization are associated with a per-unit amount of environmental impact generated by the manufacturing equipment;

compare the combined eco-efficiency characterization to an updated combined eco-efficiency characterization associated with an updated design of the manufacturing equipment; and implement, based on the updated combined eco-efficiency characterization, the updated design of the manufacturing equipment responsive to determining that the updated combined eco-efficiency is associated with a lower per-unit amount of environmental impact than the combined eco-efficiency characterization.

11. The system of claim 10, wherein the processing device is further to:

determine an adjustment to one or more settings associated with the manufacturing equipment, the one or more settings based on the first utility use data, the first utilization data, and the combined eco-efficiency characterization, wherein the adjustment to the one or more settings causes an increase to per-unit eco-efficiency of the manufacturing equipment; and send the adjustment to the one or more settings to the manufacturing equipment to be implemented.

12. The system of claim 10, wherein to calculate the combined eco-efficiency characterization the processing device is further to:

receive a selection of subcomponents of the manufacturing equipment, each subcomponent having a plurality of subcomponent inputs; and calculate the combined eco-efficiency characterization based on the plurality of subcomponent inputs.

13. The system of claim 10, wherein the processing device is further to:

receive a number of devices per wafer produced by the manufacturing equipment;

divide the water eco-efficiency characterization, the emissions eco-efficiency characterization, the electrical energy eco-efficiency characterization, and the combined eco-efficiency characterization by the number of devices per wafer; and determine, based on the division, a per-device water eco-efficiency characterization, per-device emissions eco-efficiency characterization, per-device electrical energy eco-efficiency characterization, and a per-device combined eco-efficiency characterization.

14. The system of claim 10, wherein the processing device is further to provide at least one of the water eco-efficiency characterization, the emissions eco-efficiency characterization, the electrical energy eco-efficiency characterization, or the combined eco-efficiency characterization for display by a graphical user interface (GUI).

15. A non-transitory machine-readable storage medium including instructions that, when accessed by a processing device, cause the processing device to:

receive a selection of a manufacturing equipment;

determine first utility use data associated with the manufacturing equipment;

receive first utilization data associated with the manufacturing equipment, wherein the first utilization data is associated with a processing time and an idle time of the manufacturing equipment;

calculate a water eco-efficiency characterization based on the first utility use data and the first utilization data;

calculate an emissions eco-efficiency characterization based on the first utility use data and the first utilization data;

calculate an electrical energy eco-efficiency characterization based on the first utility use data and the first utilization data;

calculate a combined eco-efficiency characterization associated with a design of the manufacturing equipment based on the water eco-efficiency characterization, emissions eco-efficiency characterization, and electrical energy eco-efficiency characterization and the first utilization data, wherein the water eco-efficiency characterization, emissions eco-efficiency characterization, electrical energy eco-efficiency characterization, and combined eco-efficiency characterization are associated with a per-unit amount of environmental impact generated by the manufacturing equipment;
compare the combined eco-efficiency characterization to an updated combined eco-efficiency characterization associated with an updated design of the manufacturing equipment; and
implement, based on the updated combined eco-efficiency characterization, the updated design of the manufacturing equipment responsive to determining that the updated combined eco-efficiency is associated with a lower per-unit amount of environmental impact than the combined eco-efficiency characterization.

16. The non-transitory machine-readable storage medium of claim 15, wherein the processing device is further to:
determine an adjustment to one or more settings associated with the manufacturing equipment, the one or more settings based on the first utility use data, the first utilization data, and the combined eco-efficiency characterization, wherein the adjustment to the one or more settings causes an increase to per-unit eco-efficiency of the manufacturing equipment; and
send the adjustment to the one or more settings to the manufacturing equipment to be implemented.

17. The non-transitory machine-readable storage medium of claim 15, wherein the processing device is further to:
receive a selection of subcomponents of the manufacturing equipment, each subcomponent having a plurality of subcomponent inputs; and
calculate the combined eco-efficiency characterization based on the plurality of subcomponent inputs.

18. The non-transitory machine-readable storage medium of claim 15, wherein the first utility use data is associated with at least one of: cooling water, utility nitrogen, compressed air, exhaust, deionized water, mechanical vacuum systems, process gas, direct electrical energy, direct industrial water, liquid process chemicals, or drain systems.

19. The non-transitory machine-readable storage medium of claim 15, wherein the processing device is further to provide at least one of the water eco-efficiency characterization, the emissions eco-efficiency characterization, the electrical energy eco-efficiency characterization, or the combined eco-efficiency characterization for display by a graphical user interface (GUI).

* * * * *